United States Patent [19]

Satoh et al.

[11] Patent Number: 5,677,086
[45] Date of Patent: Oct. 14, 1997

[54] CATHODE MATERIAL FOR LITHIUM SECONDARY BATTERY AND METHOD FOR PRODUCING LITHIATED NICKEL DIOXIDE AND LITHIUM SECONDARY BATTERY

[75] Inventors: Tomoari Satoh; Kenji Nakane; Yasunori Nishida, all of Tsukuba, Japan

[73] Assignee: Sumitomo Chemical Company, Limited, Osaka, Japan

[21] Appl. No.: 675,288

[22] Filed: Jul. 1, 1996

Related U.S. Application Data

[63] Continuation of Ser. No. 274,414, Jul. 13, 1994, abandoned.

[30] Foreign Application Priority Data

| Jul. 15, 1993 | [JP] | Japan | 5-175198 |
| Dec. 27, 1993 | [JP] | Japan | 5-330242 |
| May 12, 1994 | [JP] | Japan | 6-098379 |

[51] Int. Cl.$^6$ .................................................. H01M 4/52
[52] U.S. Cl. .............................................. 429/223; 429/218
[58] Field of Search .................................... 429/218, 223

[56] References Cited

U.S. PATENT DOCUMENTS

| 4,567,031 | 1/1986 | Riley | 423/593 |
| 4,980,080 | 12/1990 | Lecerf et al. | 429/223 |
| 5,264,201 | 11/1993 | Dahn et al. | 429/223 |
| 5,308,720 | 5/1994 | Kurokawa et al. | 429/223 |
| 5,316,875 | 5/1994 | Murai et al. | 429/223 |
| 5,490,320 | 2/1996 | Hasegawa et al. | 429/223 |

FOREIGN PATENT DOCUMENTS

| 0017400A1 | 3/1980 | European Pat. Off. ......... H01M 4/48 |
| 0345707 | 12/1989 | European Pat. Off. . |
| 0468942 | 1/1992 | European Pat. Off. . |
| 0556555 | 8/1993 | European Pat. Off. . |
| 0573040 | 12/1993 | European Pat. Off. . |
| 63-59507 | 11/1988 | Japan .............................. H01M 10/36 |
| 240861 | 2/1990 | Japan . |
| 644971 | 1/1994 | Japan . |
| 2242898 | 10/1991 | United Kingdom . |

OTHER PUBLICATIONS

Dahn et al, "Structure and Electrochemistry of $Li_{1\pm x}NiO_2$ and a New $Li_2NiO_2$ Phase with the $Ni(OH)_2$ Structure," Solid State Ionics, vol. 44, pp. 87–97 (1990) (no month available).

T. Ohzuku et al, "An Approach to Secondary Nonaqueous Lithium Cell (I) Synthesis and Characterization of $LiNiO_2$", The 33rd Battery Meeting [1A07 (1992)], pp. 13–14 (no month available).

H. Arai et al, "Synthesis and Characterization of $LiNiO_2$, as a cathode material for secondary lithium battery", The 33rd Battery Meeting [1A11(1992)], pp. 21–22 (no month available).

R. Kanno et al, "Phase Relationship and Lithium De-intercalation of the Lithium Nickel Oxides", The 60th Meeting of Electrochemical Association 1G20 (1993) (no month available).

J.R. Dahn, "Structure and Electrochemistry of $Li_{1\pm x}NiO_2$ and a new $Li_2NiO_2$ phase with the $Ni(OH)_2$ structure" Solid State Ionics vol. 44, pp. 87–97 (1990), (no month available).

Bronger et al, "Zur Kenntnis der Niccolate der Alkalimetalle" Zeitschrift für Anorganische und Allgemeine Chemie, 333, 188 (1964) (no month available).

Dahn et al., "Structure and electrochemistry of Li(1+/–y)NiO2 and a new Li2NiO2 phase with the Ni(OH)2 structure", Solid State Ionics 44(1990) pp. 87–.97 (no month) 1990.

*Primary Examiner*—Prince Willis, Jr.
*Assistant Examiner*—Carol Chaney
*Attorney, Agent, or Firm*—Sughrue, Mion, Zinn, Macpeak & Seas, PLLC

[57] ABSTRACT

The invention provides a cathode material for lithium secondary battery containing lithiated nickel dioxide having excellent charge/discharge characteristics and a process for producing the lithiated nickel dioxide, and a lithium secondary battery. That is, the cathode material for lithium secondary battery contains lithiated nickel dioxide having $\alpha$-$NaFeO_2$ structure and shows a coulomb efficiency of 85% or higher at the first charging and discharging, and the process for producing lithiated nickel dioxide comprises dispersing a nickel compound in a lithium nitrate solution, then evaporating the solvent to obtain a mixture of lithium nitrate and the nickel compound and firing the mixture in an atmosphere containing oxygen.

4 Claims, No Drawings

CATHODE MATERIAL FOR LITHIUM SECONDARY BATTERY AND METHOD FOR PRODUCING LITHIATED NICKEL DIOXIDE AND LITHIUM SECONDARY BATTERY

This is a Continuation of application Ser. No. 08/274,414 filed Jul. 13, 1994 and abandoned Aug. 21, 1996.

BACKGROUND OF THE INVENTION

The present invention relates to a cathode material for lithium secondary batteries which contains lithiated nickel dioxide, and a method for producing the lithiated nickel dioxide which is a composite oxide, and a lithium secondary battery.

Lithiated cobalt dioxide having an $\alpha$-$NaFeO_2$ structure of hexagonal system (hereinafter sometimes abbreviated as "lithiated cobalt dioxide") is a compound having a structure where lithium ions and cobalt ions are alternately and regularly arranged in layers in the direction perpendicular to the closest-packing of oxygen ions. Due to this structure, diffusion of lithium ions in the layers is relatively easy and lithium ions can be electrochemically doped or undoped. Utilizing this property, lithiated cobalt dioxide has already been put to practical use as a cathode material for lithium secondary batteries for electric sources of some of pocket telephones and video cameras. Furthermore, lithium secondary batteries are expected as high-performance small secondary batteries of the succeeding generation and as electric sources for electric vehicles or power storage apparatuses for load leveling in the future. Thus, lithiated cobalt dioxide is being studied to be applied as cathode materials for lithium secondary batteries.

On the other hand, lithiated nickel dioxide having the $\alpha$-$NaFeO_2$ structure of hexagonal system (hereinafter sometimes abbreviated as "lithiated nickel dioxide") is also known as a substance having the same properties as lithiated cobalt dioxide and the lithiated nickel dioxide is more useful because of the low cost for starting materials and the rich resources thereof. However, owing to difficulty in its synthesis, researches have been mainly made on lithiated cobalt dioxide.

One reason for the difficulty in synthesis of lithiated nickel dioxide is that upon being fired at a high temperature exceeding 800° C., so-called rock salt domain where lithium ions and nickel ions are irregularly arranged (hereinafter sometimes referred to as "rock salt domain") increasingly incorporates into the products. Not only the rock salt domain does not contribute to charging and discharging, but also it hinders the reversible structural change to occur when lithium ion is drawn out from lithiated nickel dioxide. Therefore, if rock salt domain incorporates into lithiated nickel dioxide, the resulting secondary battery cannot have sufficient discharge capacity.

It is known that if firing is carried out at a low temperature of lower than 800° C. for avoiding the incorporation of the rock salt domain, substitution of nickel for lithium site is apt to occur. It is considered that this is because decomposition reaction and diffusion of lithium compounds such as lithium carbonate used as a starting material are in rate-determining and consequently supply of lithium is delayed. It is said that presence of nickel in the lithium site hinders the diffusion of lithium ions to adversely affect the charge/discharge characteristics. In this case, the Li/Ni ratio of samples is lower than 1. The relation between the ratio and the initial discharge capacity has been investigated and it is reported that with increase in the Li/Ni ratio the discharge capacity increases [Arai et al, Lecture No. 1A11 in The 33rd Battery Symposium in Japan (1992)].

Therefore, when use as a cathode material for lithium secondary batteries is intended, it is desired to obtain lithiated nickel dioxide which does not contain the rock salt domain which does not contribute to charging and discharging and hinders the reversible charging and discharging to occur and which contains nickel in the lithium site in an amount of as small as possible (the presence of nickel adversely affecting the diffusion of lithium ions), namely, it is desired to obtain $LiNiO_2$ having a layered structure and having a stoichiometric composition.

As an attempt, it has been proposed to use lithium oxide $Li_2O$ which requires no decomposition of lithium compound prior to the reaction for production of lithiated nickel dioxide [N. Bronger et al, Z. Anorg. Allg. Chem., 333, 188 (1964)] and lithium peroxide $Li_2O_2$ [Sugano et al, Lecture No. 1G20 in the 60th Meeting of the Electrochemical Society of Japan (1993)]. However, the starting materials in these processes are available with difficulty and furthermore, readily react with carbon dioxide or water in the air and cannot be handled in the air.

Moreover, JP-A 2-40861 discloses a process for obtaining $Li_yNi_{2-y}O_2$ (y is in the range of 0.84–1.22) by mixing lithium hydroxide and nickel oxide in the form of powder and firing the mixture in the air at 600°–800° C. However, according to the disclosure of this patent publication, when $Li_yNi_{2-y}O_2$ obtained by the process is used as the cathode material of lithium secondary batteries, the capacity decreases by repetition of charge-discharge cycles in the case of carrying out the charge-discharge test with a constant current of 0.2 mA/cm$^2$ at the maximum charging voltage Vmax=4.25 V and the minimum discharging voltage Vmin=3 V. That is, it can be seen from the drawings in the patent publication that the cycle characteristics are not good and the 30th discharge capacity is only about 60% of that of the 5th discharge capacity. Thus, the performance of the products as the cathode materials for lithium secondary batteries is still insufficient.

Furthermore, it was reported that lithiated nickel dioxide obtained by mixing lithium nitrate as the lithium compound with nickel carbonate or nickel hydroxide in the form of powder and firing the mixture at 750° C. for 15 hours in oxygen showed a discharge capacity of about 160 mAh/g when subjected to charge and discharge test with a constant current of 0.17 mA/cm$^2$ at Vmax=4.2 V and Vmin=2.5 V and showed excellent coulomb efficiency E of 99.3% at the second and the following charging and discharging. However, there is no specific report on the first efficiency although it can be inferred that it is considerably lower than the second and the following efficiencies. [Ozuki etal, Lecture No. 1A07 in the 33rd Battery Symposium in Japan (1992)].

A further known process comprises dispersing nickel hydroxide powders in an aqueous lithium hydroxide solution, precipitating lithium hydroxide on the surface of nickel hydroxide powders by spray drying and then, firing the powders at 600° C. for 4 hours in the air (J. R. Dahn etal, Solid State Ionics, 44, 87(1990)). Since the product obtained by this process contains a small amount of lithium hydroxide and lithium carbonate, the product must be washed with water. During this washing step, a part of lithium ions of lithiated nickel dioxide are replaced with hydrogen ion $H^+$. Therefore, lithiated nickel dioxide must be further fired at 600° C. for 1 hour in the air to remove the hydrogen ions as water. Thus, the process includes very complicated steps and is industrially not efficient.

As explained above, cathode materials containing lithiated nickel dioxide which show excellent charge/discharge characteristics when used in lithium secondary batteries have not yet been produced by the conventional processes.

SUMMARY OF THE INVENTION

The object of the present invention is to provide lithiated nickel dioxide having the $\alpha$-$NaFeO_2$ type structure used for cathode materials of lithium secondary batteries having excellent charge/discharge characteristics, and a process for producing the same, and a lithium secondary battery.

The inventors have conducted intensive research and found that when lithiated nickel dioxide obtained by dispersing a nickel compound in a lithium nitrate solution and then, drying the dispersion to thereby mix lithium nitrate and the nickel compound and, thereafter, firing the mixture, is used as a cathode of lithium secondary batteries, a coulomb efficiency of 80% or higher is shown at the first charging and discharging. As a result, the present invention has been accomplished.

That is, the present invention includes the following inventions.

(1) A cathode material for lithium secondary batteries which contains lithiated nickel dioxide having the $\alpha$-$NaFeO_2$ structure, characterized in that the coulomb efficiency at the first charging and discharging is 80% or higher.

(2) A process for producing the lithiated nickel dioxide of the above (1), characterized by dispersing a nickel compound in a lithium nitrate solution, volatilizing the solvent to obtain a mixture of lithium nitrate and the nickel compound and firing the mixture in an atmosphere containing oxygen.

(3) A lithium secondary battery having an anode comprising lithium metal, a lithium alloy or a material in which lithium can be doped and undoped, a cathode comprising a material in which lithium ion can be doped and from which lithium ion can be undoped, and a liquid or solid electrolyte wherein the cathode contains lithiated nickel dioxide of the above (1).

DESCRIPTION OF THE INVENTION

The cathode material for lithium secondary batteries containing the lithiated nickel dioxide of the present invention and the process for producing the lithiated nickel dioxide of the present invention will be in detail explained below.

The coulomb efficiency E at charging and discharging is defined by the following formula.

$$E = (\text{discharge capacity})/(\text{charge capacity}) \times 100$$
$$= (\text{discharge current} \times \text{discharging time})/(\text{charging current} \times \text{charging time}) \times 100 \, (\%)$$

When the lithiated nickel dioxide is used as the cathode material for lithium secondary batteries, it is the problem that the coulomb efficiency at the first charging and discharging is much less than 100%, namely, there is so-called irreversible capacity,, and hitherto, cathode materials having a coulomb efficiency at the first charging and discharging of 80% or higher have not yet been obtained.

The cathode material containing the lithiated nickel dioxide of the present invention is characterized in that the coulomb efficiency at the first charging and discharging is 80% or higher, preferably 85% or higher. Furthermore, the cathode material containing lithiated nickel dioxide of the present invention is characterized in that the efficiency at the second and the following charging and discharging is 99% or higher and degradation of the cycling behavior is small.

Next, the lithium secondary battery of the present invention will be explained in detail.

The cathode of the lithium secondary battery of the present invention contains the above-mentioned lithiated nickel dioxide of the present invention as an active material. The cathode includes, for example, the one which contains the lithiated nickel dioxide, a carbonaceous material as a conductive diluent, a thermoplastic resin as a binder, etc. The carbonaceous materials include natural graphite, artificial graphite, cokes, etc. The thermoplastic resins include poly(vinylidene fluoride), polytetrafluoroethylene, polyethylene, polypropylene, etc.

As the anode of the lithium secondary battery of the present invention, there may be used lithium metal, lithium alloys or materials in which lithium ion can be doped or from which lithium ion can be undoped. The materials in which lithium ion can be doped or from which lithium ion can be undoped include, for example, carbonaceous materials such as natural graphite, artificial graphite, cokes, carbon black, pyrolytic carbons, carbon fibers, and fired products of organic polymer compounds. Shape of the carbonaceous materials may be any of flakes, spheres, fibers, or agglomerates of fine powders and if necessary, thermoplastic resins as a binder may be added. The thermoplastic resins include poly(vinylidene fluoride), polyethylene, polypropylene, etc.

The electrolyte of the lithium secondary battery of the present invention may be known ones selected from nonaqueous liquid electrolytes comprising an organic solvent in which a lithium salt is dissolved and solid electrolytes. As the lithium salt, mention may be made of $LiClO_4$, $LiPF_6$, $LiAsF_6$, $LiSbF_6$, $LiBF_4$, $LiCF_3SO_3$, $LiN(CF_3SO_2)_2$, $Li_2B_{10}Cl_{10}$, lithium salts of lower aliphatic carboxylic acids, $LiAlCl_4$, etc. These may be used each alone or as a mixture of two or more. As the organic solvent, mention may be made of carbonates such as propylene carbonate, ethylene carbonate, dimethyl carbonate and diethyl carbonate, ethers such as 1,2-dimethoxyethane, 1,3-dimethoxypropane, tetrahydrofuran and 2-methyltetrahydrofuran, esters such as methyl formate, methyl acetate and $\gamma$-butyrolactone, nitriles such as acetonitrile and butyronitrile, amides such as N,N-dimethylformamide and N,N-dimethylacetamide, carbamates such as 3-methyl-2-oxazolidone, and sulfur-containing compounds such as sulfolane, dimethyl sulfoxide and 1,3-propane sultone. Normally, these are used in admixture of two or more. Among them, preferred are mixed solvents containing carbonates and more preferred are mixed solvents of cyclic carbonates and noncylic carbonates or mixed solvents of cyclic carbonates and ethers. As the solid electrolytes, mention may be made of polymer electrolytes such as polyethylene oxide type and polymer compounds containing at least one of polyorganosiloxane branches and polyoxyalkylene branches and inorganic compound electrolytes of sulfide type such as $Li_2S$-$SiS_2$, $Li_2S$-$GeS_2$, $Li_2S$-$P_2S_5$ and $Li_2S$-$B_2S_3$ and those containing sulfides such as $Li_2S$-$SiS_2$-$Li_3PO_4$ and $Li_2S$-$SiS_2$-$Li_2SO_4$. Furthermore, there may also be used so-called gel type electrolytes comprising polymers which carry nonaqueous liquid electrolytes.

The shape of the lithium secondary battery of the present invention is not limitative and may be any of paper type, coin type, cylindrical type and prismatic/rectangular type.

Lithium nitrate used as a starting material is preferably of high purity. The particle size has no special limitation because lithium nitrate is once made into a solution and then mixed with a nickel compound.

The solvents used for dissolving lithium nitrate include, for example, water and alcohols such as ethanol. Water is particularly preferred. The solvents are not limited thereto and other organic solvents which dissolve lithium nitrate can also be used. If carbon dioxide is present in the solvent, there is the possibility of hardly soluble lithium carbonate being produced. Therefore, it is preferred to carry out decarboxylation operation prior to preparation of the lithium nitrate solution, but this operation is not essential.

As the nickel compounds to be dispersed in the lithium nitrate solution, there may be used nickel oxides, nickel carbonate, nickel hydroxide, etc. The nickel oxides include, for example, nickel monoxide (NiO), nickel sesquioxide ($Ni_2O_3$) and trinickel tetroxide ($Ni_3O_4$). Nickel sesquioxide and trinickel tetroxide include hydrate compounds thereof.

The nickel compound is preferably of high purity. Furthermore, considering the dispersibility thereof and further considering that lithium nitrate is precipitated on the surface thereof, the average particle size of the nickel compound is preferably 100 μm or smaller, more preferably 50 μm or smaller. The nickel compound preferably has a specific surface area of 1 $m^2/g$ or more.

When the nickel compound is dispersed in the lithium nitrate solution, preferably the nickel compound is charged in a vacuum container and the container is vacuumized, and thereafter, lithium nitrate solution is added to vacuum impregnate the nickel compound with the lithium nitrate solution. Thus, the lithium nitrate solution penetrates into the pores of the nickel compound and more uniform mixing of them can be performed. Lithiated nickel dioxide obtained by firing the thus obtained mixture is the same in discharge capacity as one obtained without the vacuum impregnation, but variation in discharge capacity among samples diminishes.

The mixing ratio of lithium nitrate and the nickel compound can be the stoichiometric composition ratio of Li/Ni= 1, but preferably is in the range of $1.0 \leq Li/Ni \leq 1.1$. When the ratio is smaller than 1.0, the resulting composite oxide is short of lithium if there is a loss in the lithium nitrate solution. When the ratio exceeds 1.1, the unreacted lithium component forms lithium carbonate when the product is handled in the air after firing and remains at a high proportion in the sample to cause decrease of discharge capacity.

A rotary evaporator or a spray drier can be used for evaporation of the solvent from the lithium nitrate solution in which the nickel compound is dispersed. Alternatively, there may be used so-called spray pyrolysis apparatus comprising combination of a spray drier and a vertical firing furnace which simultaneously carries out the drying and the firing.

The firing atmosphere used is an atmosphere containing oxygen. Examples of the atmosphere are a mixed gas comprising an inert gas and oxygen and atmospheres containing oxygen such as air. A higher oxygen partial pressure of the firing atmosphere is preferred. The firing is carried out preferably in oxygen, more preferably in oxygen stream.

Furthermore, it is preferred to dry the mixed powder of lithium nitrate and the nickel compound before firing. However, it is not preferred to dry the mixture at higher than the melting point of lithium nitrate because there may occur phase separation. The lithiated nickel dioxide obtained by firing the mixture in this way is the same in discharge capacity as one obtained without the drying step, but variation in discharge capacity among the samples diminishes.

The firing temperature is preferably 350°–800° C., more preferably 600°–750° C. If the firing temperature is higher than 800° C., incorporation of the rock salt domain increases and this is not preferred. If it is lower than 350° C., the reaction of production of lithiated nickel dioxide hardly proceeds and this is also not preferred.

The firing time is preferably 2 hours or longer, more preferably 5 hours or longer.

In the process of the present invention, washing of the lithiated nickel dioxide powder after fired is not needed, but if necessary, the washing step and the subsequent heat treating step or the heat treating step alone can be added.

The following nonlimiting examples explain the present invention in more detail.

Unless otherwise notified, the electrode was prepared in the following manner. That is, 88 wt % of lithiated nickel dioxide as an active material, 6 wt % of acetylene black (trademark Denka Black 50% pressed product manufactured by Denki Kagaku Kogyo Kabushiki Kaisha) as a conductive diluent and 6 wt % of a fluoropolymer (trademark Teflon 30-J manufactured by Du Pont-Mitsui Fluorochemicals Co., Ltd.) as a binder were kneaded with water to prepare a paste. This paste was coated on a #200 stainless steel mesh as a current collector and vacuum dried at 150° C. for 8 hours.

EXAMPLE 1

7.23 g of lithium nitrate (special reagent grade, manufactured by Wako Pure Chemical Industries, Ltd.) was dissolved in 100 g of ethanol (special reagent grade, manufactured by Wako Pure Chemical Industries, Ltd.) and to the solution was further added 12.54 g of nickel carbonate ($NiCO_3 \cdot 2Ni(OH)_2 \cdot 4H_2O$, reagent grade, manufactured by Wako Pure Chemical Industries, Ltd.) and was thoroughly dispersed. Thereafter, ethanol was evaporated by a rotary evaporator. The resulting mixed powder was lightly ground by a mortar made of agate and then, introduced into a tubular furnace having an alumina core tube and fired at 700° C. for 15 hours in 50 $cm^3$/min of an oxygen stream. It was confirmed by powder X-ray diffraction that the resulting lithiated nickel dioxide powder had $\alpha$-$NaFeO_2$ structure.

The lithiated nickel dioxide powder was processed to an electrode. A plate type battery was fabricated using the electrode, a solution prepared by dissolving lithium perchlorate at a concentration of 1 mol/liter in a mixture of propylene carbonate (PC) and 1,2-dimethoxyethane (DME) (1:1) as a liquid electrolyte, a polypropylene microporous membrane as a separator, and metallic lithium as a counter electrode (anode).

The battery was subjected to charge and discharge test at room temperature with a constant current of 0.17 mA/$cm^2$ at a maximum charging voltage Vmax=4.2 V and a minimum discharge voltage Vmin=2.5 V. Coulomb efficiencies and discharge capacities at the 1st to 5th charging and discharging are shown in Table 1. The coulomb efficiency at the 1st charging and discharging was 89%.

EXAMPLE 2

10.85 g of lithium nitrate (special reagent grade, manufactured by Wako Pure Chemical Industries, Ltd.) was dissolved in 150 g of ethanol (special reagent grade, manufactured by Wako Pure Chemical Industries, Ltd.) and to the solution was further added 12.41 g of nickel sesquioxide (EP grade, manufactured by Nacalai Tesque, Inc.) and was thoroughly dispersed. Thereafter, in the same manner as in Example 1, ethanol was evaporated by a rotary evaporator and the resulting mixed powder was fired at 700° C. for 15 hours in 50 cm₃/min of an oxygen stream. It was confirmed by powder X-ray diffraction that the resulting lithiated nickel dioxide powder had α-NaFeO₂ structure.

In the same manner as in Example 1, a plate type battery was fabricated using the lithiated nickel dioxide powder. The battery was subjected to charge and discharge test at room temperature with a constant current of 0.17 mA/cm² at Vmax=4.2 V and Vmin=2.5 V. Coulomb efficiencies and discharge capacities at the 1st to 5th charging and discharging are shown in Table 1. The coulomb efficiency at the 1st charging and discharging was 89%.

EXAMPLE 3

7.23 g of lithium nitrate (special reagent grade, manufactured by Wako Pure Chemical Industries, Ltd.) was dissolved in 10 g of pure water and to the solution was further added 12.54 g of nickel carbonate (NiCO₃.2Ni(OH)₂.4H₂O, reagent grade, manufactured by Wako Pure Chemical Industries, Ltd.) and was thoroughly dispersed. Thereafter, in the same manner as in Example 1, water was evaporated by a rotary evaporator and the resulting mixed powder was fired at 700° C. for 15 hours in 50 cm³/min of an oxygen stream. It was confirmed by powder X-ray diffraction that the resulting lithiated nickel dioxide powder had α-NaFeO₂ structure.

In the same manner as in Example 1, a plate type battery was fabricated using the lithiated nickel dioxide powder. The battery was subjected to charge and discharge test with a constant current of 0.17 mA/cm² at Vmax=4.2 V and Vmin=2.5 V. Coulomb efficiencies and discharge capacities at the 1st to 5th charging and discharging are shown in Table 1. The coulomb efficiency at the 1st charging and discharging was 86%.

COMPARATIVE EXAMPLE 1

15.46 g of lithium nitrate (special reagent grade, manufactured by Wako Pure Chemical Industries, Ltd.) and 25.71 g of nickel carbonate (NiCO₃.2Ni(OH)₂. 4H₂O, reagent grade, manufactured by Wako Pure Chemical Industries, Ltd.) were mixed in a mortar made of agate and then, the mixture was introduced into a tubular furnace having an alumina core tube and fired at 750° C. for 15 hours in 50 cm³/min of an oxygen stream. It was confirmed by powder X-ray diffraction that the resulting lithiated nickel dioxide powder had α-NaFeO₂ type structure.

In the same manner as in Example 1, a plate type battery was fabricated using the lithiated nickel dioxide powder. The battery was subjected to charge and discharge test with a constant current of 0.17 mA/cm² at Vmax=4.2 V and Vmin=2.5 V. Coulomb efficiencies and discharge capacities at the 1st to 5th charging and discharging are shown in Table 1. The coulomb efficiency at the 1st charging and discharging was 79%.

TABLE 1

|  |  | 1 | 2 | 3 | 4 | 5 |
|---|---|---|---|---|---|---|
| Example 1 | Discharge capacity mAh/g | 164 | 166 | 166 | 165 | 164 |
|  | Coulomb efficiency % | 89 | 99 | 99 | 99 | 99 |
| Example 2 | Discharge capacity mAh/g | 171 | 172 | 171 | 170 | 169 |
|  | Coulomb efficiency % | 89 | 99 | 99 | 99 | 99 |
| Example 3 | Discharge capacity mAh/g | 166 | 168 | 168 | 169 | 167 |
|  | Coulomb efficiency % | 86 | 99 | 99 | 100 | 99 |
| Comparative Example 1 | Discharge capacity mAh/g | 151 | 149 | 148 | 147 | 148 |
|  | Coulomb efficiency % | 79 | 98 | 98 | 98 | 99 |

The cathode materials containing lithiated nickel dioxide of the present invention are prepared using nickel compounds which are inexpensive and rich in resources. Therefore, from the point of material cost, the cathode materials according to the present invention are advantageous over those containing lithiated cobalt dioxide prepared using expensive cobalt compounds. Furthermore, when they are used as cathode materials for lithium secondary batteries which carry out electrochemical doping and undoping of lithium ions in a nonaqueous solvent system, the batteries show a coulomb efficiency of 80% or higher at the 1st charging and discharging and have excellent charge/discharge characteristics. Thus, the industrial value of the present invention is remarkably great.

What is claimed is:

1. A cathode material for a lithium secondary battery comprising lithiated nickel dioxide having an α-NaFeO₂ structure before a first charging/discharging cycle of the battery and maintaining the α-NaFeO₂ structure after the first charging/discharging cycle, and the cathode material having a first charging/discharging coulomb efficiency of at least 85% contributed by the α-NaFeO₂ structure.

2. A cathode material for a lithium secondary battery consisting essentially of lithiated nickel dioxide having an α-NaFeO₂ structure, said α-NaFeO₂ structure being maintained between a maximum voltage of 4.2V and a minimum voltage of 2.5V, the cathode material having a first charging and discharging coulomb efficiency of at least 85%.

3. A lithium secondary battery, comprising an anode of a material comprising lithium metal, a lithium alloy or a material in which lithium can be doped and undoped, a cathode comprising lithiated nickel dioxide having an α-NaFeO₂ structure before a first charging/discharging cycle of the battery and maintaining the α-NaFeO₂ structure after the first charging/discharging cycle in which lithium ion can be doped and from which lithium ion can be undoped, and a liquid or solid electrolyte, the cathode material having a first charging/discharging coulomb efficiency of at least 85% contributed by the α-NaFeO₂ structure.

4. A lithium secondary battery, comprising an anode of a material comprising lithium metal, a lithium alloy or a material in which lithium can be doped and undoped, a cathode consisting essentially of lithiated nickel dioxide having an α-NaFeO₂ structure in which lithium ion can be doped and from which lithium ion can be undoped, said α-NaFeO₂ structure being maintained between a maximum voltage of 4.2V and a minimum voltage of 2.5V, and a liquid or solid electrolyte, the cathode material having a first charging and discharging coulomb efficiency of at least 85%.

* * * * *

UNITED STATES PATENT AND TRADEMARK OFFICE
CERTIFICATE OF CORRECTION

PATENT NO. : 5,677,086
DATED : October 14, 1997
INVENTOR(S) : Satoh et al.

It is certified that error appears in the above-identified patent and that said Letters Patent is hereby corrected as shown below:

Column 8,
Line 35, "85%" should read -- 89% --
Line 53, "85%" should read -- 89% --

Signed and Sealed this

Twenty-seventh Day of July, 2004

JON W. DUDAS
*Acting Director of the United States Patent and Trademark Office*